T. Bachelder,

Wood Joiner,

Nº 11,744.

Patented Oct. 3, 1854.

T. Bachelder,
Wood Joiner,

No. 11,744.

Patented Oct. 3, 1854.

UNITED STATES PATENT OFFICE.

THOMAS BATCHELDER, OF CANDIA, NEW HAMPSHIRE.

MACHINE FOR MANUFACTURING THE FRAMES OF WOOD-SAWS.

Specification of Letters Patent No. 11,744, dated October 3, 1854.

*To all whom it may concern:*

Be it known that I, THOMAS BATCHELDER, of Candia, in the county of Rockingham and State of New Hampshire, have invented a new and useful Improvement in Machinery for Manufacturing the Frames of Wood-Saws; and I do hereby declare that the same is fully described and represented in the following specification and the accompanying drawings, letters, figures, and references thereof.

Figure 1:
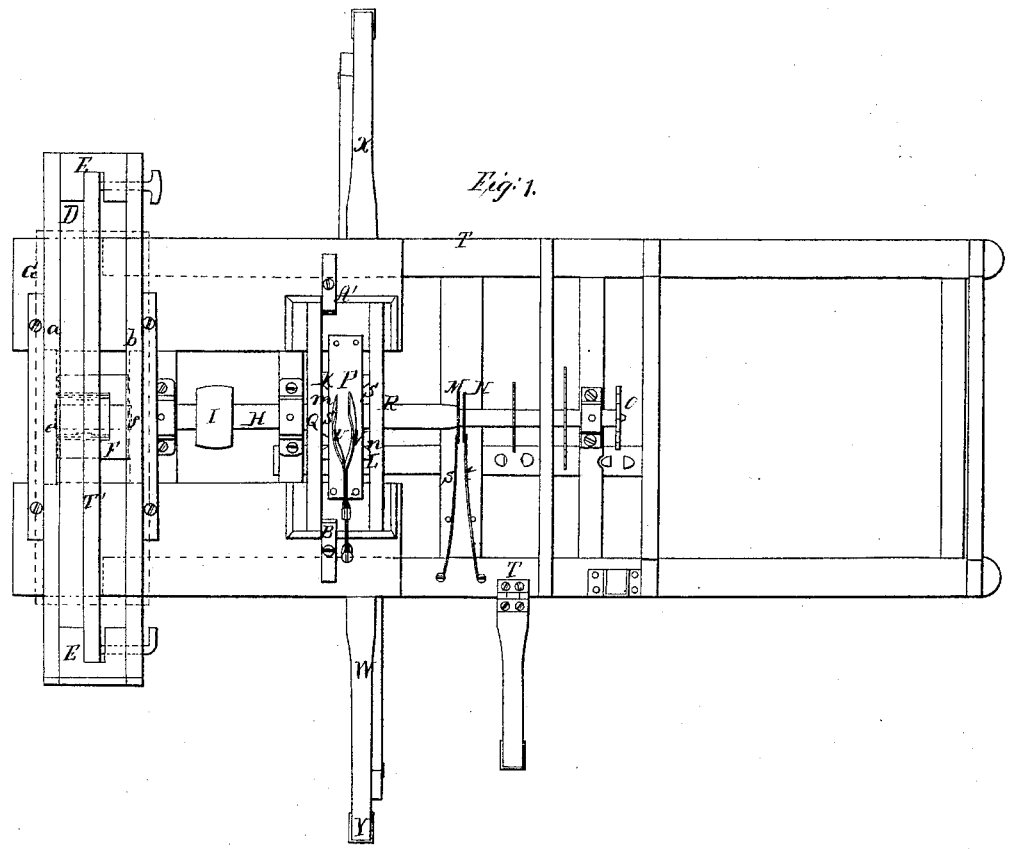
Figure 3:
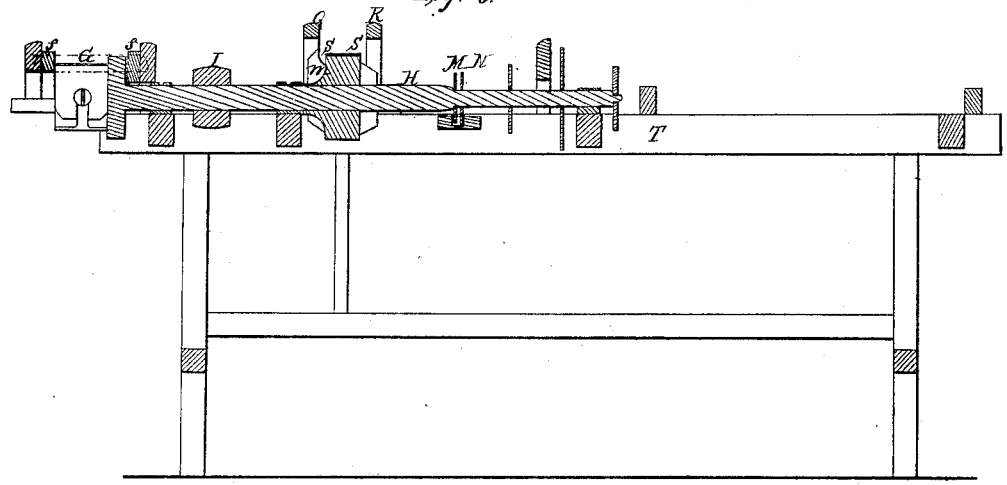
Figure 2:
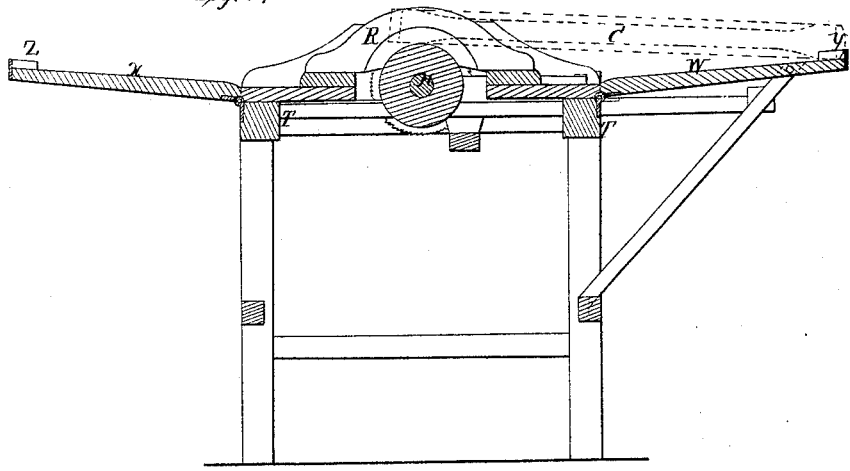
Figure 4:
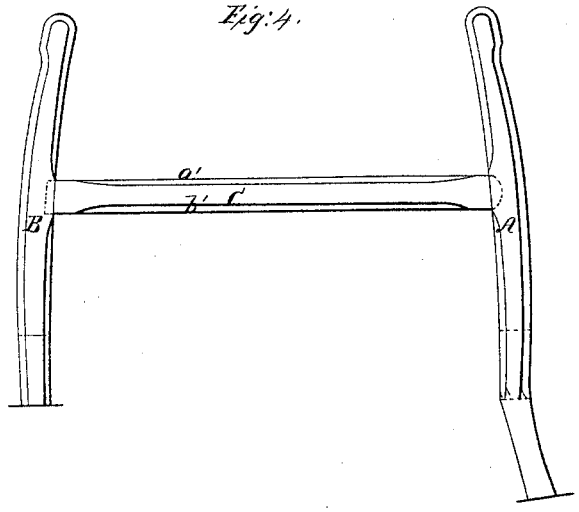

Of the said drawings, Figure 1, represents a top view of my improved machine. Fig. 2, is a transverse and vertical section of it taken through the bottom rest of a mechanism for chamfering the edges of the bars of the saw frame. Fig. 3, is a vertical and longitudinal section of my said machine. Fig. 4, is a side view of one of the saw frames shaped or made by it.

This machine is calculated to perform in succession the several operations necessary for giving form to the three several pieces or bars A, B, C, of the wood saw frame, the bar A, being a hand bar or that which is held in the hand of a person while the saw is being used.

The first part of the machine consists of that for forming the two upright bars A, B, or giving to them the shape — — — which they appear to have when viewed sideways. The next part of the machine performs the function of planing either of the three bars, or their respective sides. In reducing a bar A, or B, or giving form to it as seen in Fig. 4, it is confined as represented at, D, within a frame, E, whose two sides, *a, b*, are made to correspond in shape to the bar. This frame rests on supporting rails *e, f*, which have between them a rotary cutting cylinder, F. When the frame is moved over this cylinder and kept in contact with the said rails or ways, the cylinder is made to reduce the saw bar to the shape each of the frame bars has in its longitudinal section. The frame that holds the piece of wood to be operated upon being first moved over to the knife in one direction and then reversed or turned bottom upward and again moved, so as to cause the cutter cylinder in the mean time to successively operate on and reduce the two opposite edges of the board or piece of wood. By removing the aforesaid rails and substituting for them a board or table, which shall admit the rotary cutter cylinder to work upward through it the planing of the sides of the pieces may be effected. The position of this board or table may be as represented at G, by dotted lines.

The machine has one shaft, H, running through it; this shaft is carried by a band running over a pulley, I. The said shaft is made to carry two rotary cutter stocks, K, L, two tenoning circular saws M, two slitting circular saws and a rotary mortising bur or cutter, O, they being arranged on it as seen in the drawings. The object of the saws M, N, in connection with the spring guides, *s, t,* is to enable a person to perform the operation of making the tenons on the two ends of the connecting bar, C. The other two circular saws enable us to make the mortises or slits [in the bars, A, B,] for the reception of the saw plate.

Although I have described the general features of this machine or collection of mechanical devices, I would have it understood that the particular nature of my invention does not lie in them, although their arrangement together and their application to the frame, T, of the machine I believe is perfectly new with me.

Directly over the cutter stocks K, L, I arrange a horizontal bridge or bottom rest, P, and two vertical or side rests, Q, R, there being a space, S, between the said bridge and each of the said side rests, such space being for the purpose of enabling the chamferers or rounding cutters, *m*, or *n*, of each of the cutter stocks to work through.

Just above the bridge and between the side rests are two pressure springs, U, V, which are fastened to the frame-work, the function of each of said springs being to press a bar close against its side rest, while the said bar is being moved on the bottom rest or bridge.

Attached to the main frame and arranged in the plane of the chamfering cutters are two horizontal arms, W, X, whose ends terminate in boxes or stops, Y, Z, such stops being arranged somewhat below the upper surface of the bridge or bottom rest. The rounding cutters are provided with two stops A', B'.

In Fig. 4, it will be perceived that the chamfers, *a', b'*, of the edges of the connecting bar, C, diminish to a point at or near each end of the bar, and so that each chamfer is not of a width throughout its entire length. It is by means of the peculiar arrangement of the stop boxes, the chamfering cutters, the bridge or bottom rest, and the side rest, that I am enabled to form each of the chamfers with tapering ends. For this purpose, the inner side of each end of each stop box is arranged at a distance from the axis of the cutter shaft less than the length of the connecting bar, C, so that when the connecting bar is placed in one of the stop boxes and made to rest on the bridge in the manner as seen by dotted lines in Fig. 2, the chamfering cutters are first caused to strike the edge of the bar a short distance back of its end, the bar being so placed and the series of chamfering cutters being in rotation the bar is moved in a longitudinal direction on the bridge and away from the stop box on which it rested to and into the opposite stop box and against the end thereof. During this movement of the bar one edge of it will be chamfered down with a chamfer having the length required and two tapering ends; each end of the bar may be chamfered in this manner. The two stop boxes by their coöperation during a single movement of the piece of wood from one to another serving (in connection with the bridge, side rest, and the chamfering cutters) to cause the chamfer not only to be made in the manner described, but with its terminations in such close proximity with the ends of the bar as may be required. The rounding of the handle by means of the rounding cutters is somewhat similarly performed, and it as well as the other operations necessary to the completion of or giving form to the bars of the saw frame will be readily understood by any skilful mechanic.

What I claim is—

The arrangement and combination of the series of rotary chamfering cutters, the bridge or bottom rest P, the side rest, the back and fore stops Y, Z, the same being for the purpose of enabling a person to perform the operation of chamfering each edge of a bar and forming the chamfer with two tapering ends of a determinate length as specified.

In testimony whereof, I have hereunto set my signature this second day of May A. D. 1854.

THOMAS BATCHELDER.

Witnesses:
 B. N. COLLEY,
 LUTHER PATTEE.